(No Model.) 3 Sheets—Sheet 1.

R. E. DORTON.
BAND CUTTER AND FEEDER.

No. 439,490. Patented Oct. 28, 1890.

Witnesses:
M. M. Mortimer
N. R. Kennedy

Inventor:
R. E. Dorton
By Phil T. Dodge
Atty (No Model.) 3 Sheets—Sheet 2.

R. E. DORTON.
BAND CUTTER AND FEEDER.

No. 439,490. Patented Oct. 28, 1890.

(No Model.)  R. E. DORTON.  3 Sheets—Sheet 3.
BAND CUTTER AND FEEDER.
No. 439,490.  Patented Oct. 28, 1890.
Fig. 7.
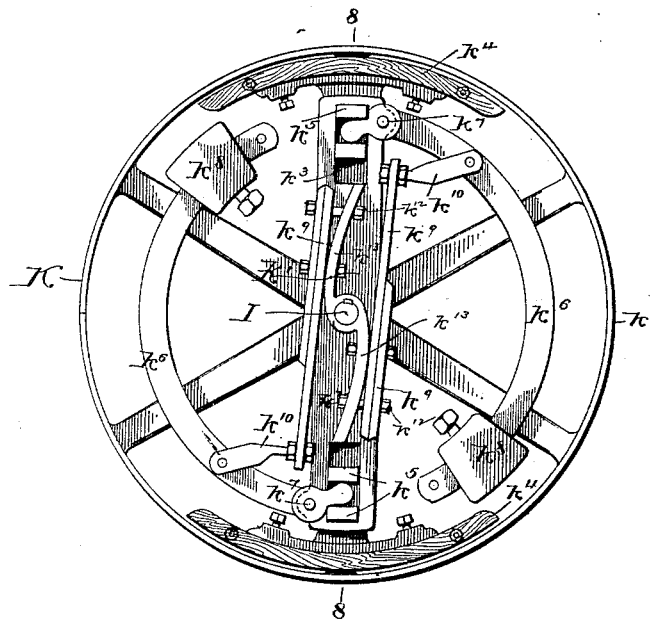
Fig. 8.
on line 8–8.
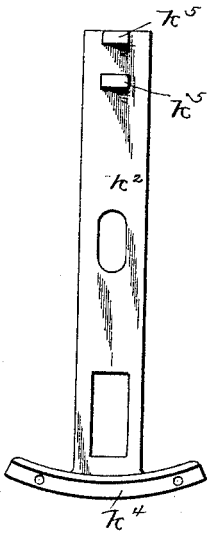
Fig. 9.
Fig. 10.
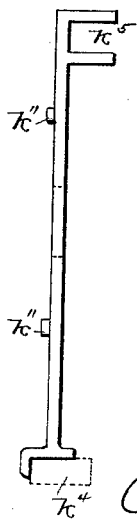
Witnesses:
Inventor:
R. E. Dorton
By Phil T. Dodge
Atty

UNITED STATES PATENT OFFICE.

ROBERT E. DORTON, OF MINNEAPOLIS, MINNESOTA, ASSIGNOR TO CHARLES A. BAKER, OF SAME PLACE.

BAND-CUTTER AND FEEDER.

SPECIFICATION forming part of Letters Patent No. 439,490, dated October 28, 1890.

Application filed January 7, 1890. Serial No. 336,165. (No model.)

*To all whom it may concern:*

Be it known that I, ROBERT E. DORTON, of Minneapolis, in the county of Hennepin and State of Minnesota, have invented certain Improvements in Band-Cutters and Feeders, of which the following is a specification.

This invention has reference to that class of mechanism which is employed for cutting the bands of grain bundles or sheaves, spreading the grain, and then delivering the same to a thrashing-machine.

The present invention relates to a feeding and cutting mechanism which is mounted on an independent truck and adapted to be adjusted for use with thrashers of different heights.

The machine has as its leading features a main carrying-apron, by which the grain is delivered to the thrasher, and two feeders delivering to the main apron from opposite sides, and each provided with a band-cutting and grain-spreading mechanism, so that two attendants may feed the grain to the main apron at the same time.

The invention relates to an improved manner of mounting the operative portions in order that the delivery end may be adjusted in height to suit different thrashers, to improvements in the band-cutting mechanism, to the peculiar arrangement of driving-gear, and to automatic means for stopping the action of the feed-apron when the speed of the thrasher-cylinder is reduced, so that it will not properly dispose of the grain.

Figure 1:
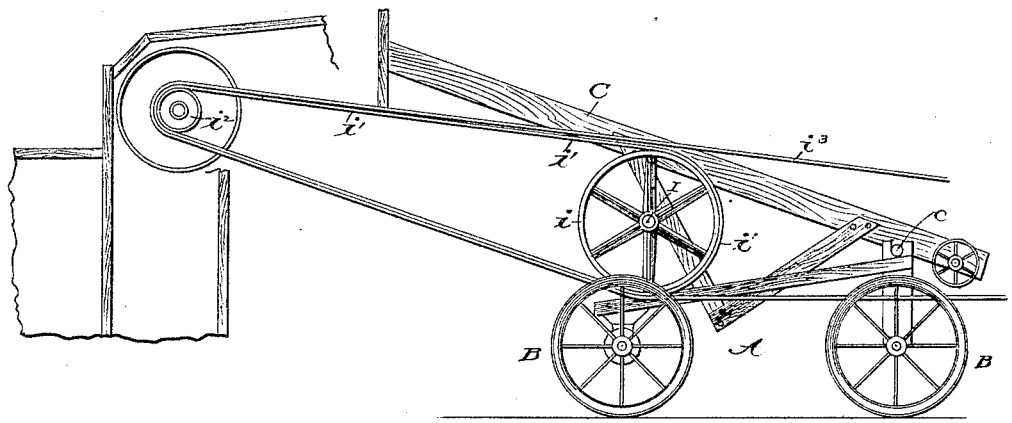
Figure 2:
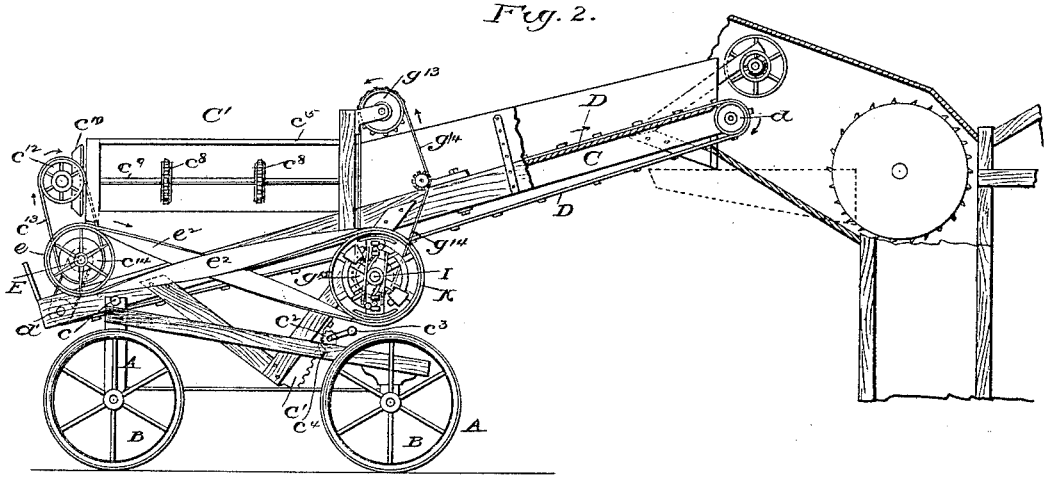
Figure 3:
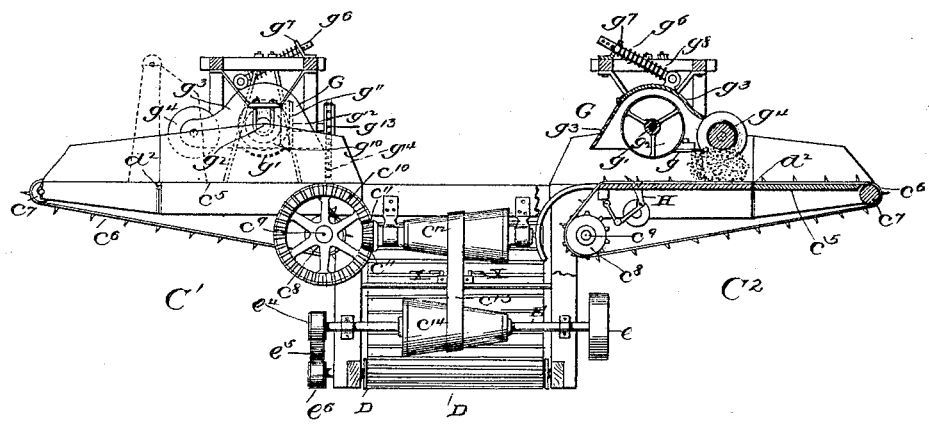
Figure 4:
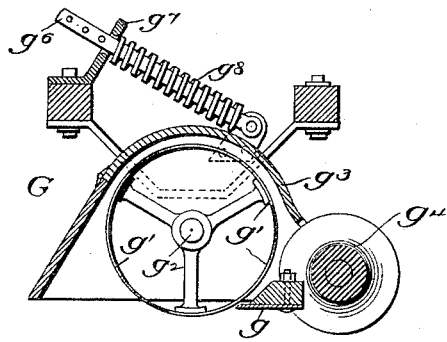
Figure 5:
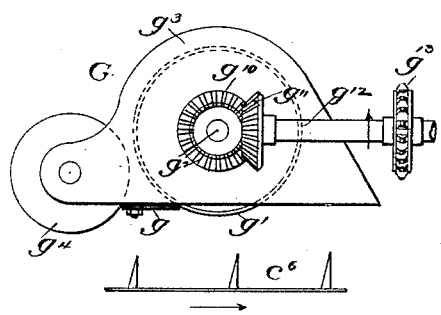
Figure 6:
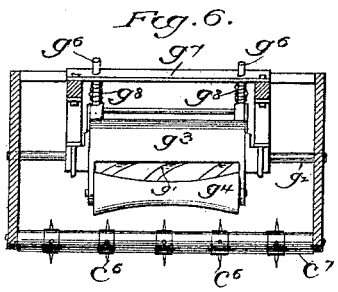

In the accompanying drawings, Figure 1 is a side elevation showing the frame-work of my machine as it appears in operative relation to a thrasher. Fig. 2 is an elevation of the same on the opposite side, the parts being shown more in detail and certain of the parts in section. Fig. 3 is an elevation, looking against the outer or receiving end of my machine, one of the lateral feed-tables and adjacent parts being shown in vertical section. Fig. 4 is a vertical cross-section through one of the band-cutters, the feeder thereunder, and adjacent parts. Fig. 5 is an end view of the parts shown in the preceding figure. Fig. 6 is a side view of the parts shown in Fig. 5. Fig. 7 is a face view of the automatic clutch through which the feeder is controlled, according to the speed of the thrasher-cylinder. Fig. 8 is a section on the line 8 8 of the preceding figure. Figs. 9 and 10 are respectively a face view and an edge view of one of the bars employed in the clutch-wheel.

Referring more particularly to Figs. 1 and 2, A represents the strong truck or base frame, which may be of any appropriate form, sustained upon ground-wheels B to admit of its being conveniently moved from place to place.

C represents the main frame of my machine, connected to the base-frame at one end by horizontal journals $c$ and provided midway of its length with curved racks $c'$, which engage with and are sustained by pinions $c^2$ on a cross-shaft provided with a hand-crank $c^3$, so that by turning the crank the delivery end of the main frame may be raised or lowered at will, according to the height of the thrasher with which my machine is to be used. A pawl $c^4$ or other locking device will be employed to maintain the frame at the proper elevation.

Within the frame C, I mount a longitudinal endless conveyer D, which may be in the form of an endless slatted apron or series of toothed chains, or any other ordinary and suitable form of conveyer adapted to receive the grain and deliver the same at the upper end of the main frame. As shown in the drawings, the conveyer-apron D passes at the upper end around a sustaining-roll $d$, and at the lower end around a second roll $d'$, through which it receives motion.

Near the lower or receiving end of the main frame C, I attach firmly thereto the side frames $C'$ and $C^2$, extending horizontally outward on opposite sides, as shown in Fig. 3, each of these secondary frames being vertically divided longitudinally of the main conveyer-frame and provided with the hinge-joint $d^2$, to admit of the outer end folding upward, as indicated in dotted lines, in order to facilitate the transportation of the machine. Each of the side frames is constructed with a horizontal top or table $c^5$ and with an endless conveyer $c^6$, designed to carry the grain inward over the table and discharge it upon the main conveyer-apron, by which it is carried to the thrasher. The conveyer $c^6$ may be in the form of toothed endless chains, as shown; or they may consist of endless aprons, toothed walking-bars, or other ordinary forms of conveyer, many of which are known to the skilled mechanic.

As shown in the drawings, the chains $c^6$ pass at their outer ends around horizontal rolls $c^7$, and at their inner ends around sprocket-wheels $c^8$ on a horizontal driving-shaft $c^9$. The shafts $c^9$ carry at their forward ends beveled gears $c^{10}$, which receive motion from pinions $c^{11}$ at opposite ends of a driving-cone $c^{12}$, mounted in bearings on the frame C. This cone receives motion through a belt $c^{13}$ from an underlying reversely-arranged cone $c^{14}$, so that by shifting the belt laterally the speed of the main conveyer may be increased or diminished in relation to that of the driving-shaft. The lower cone $c^{14}$ is carried by a transverse driving-shaft E, provided with the driving-pulley $e$, driven, as shown in Fig. 2, by a crossed belt $e^2$ from a pulley K, connected by the automatic clutch hereinafter described to the main driving-shaft I.

Over each of the side conveyers I mount a band-cutting mechanism G, consisting mainly of a fixed transverse blade or ledger-plate $g$ and a series of spiral blades $g'$, carried by arms or spiders on a central shaft $g^2$, so that their edges pass the stationary blade with a shearing action, after the manner of the cutting mechanism commonly employed in lawn-mowing machines at the present day. The cutter-shaft $g^2$ is mounted in suitable bearings and sustained upon the side frames; but the fixed blade $g$ is attached to a housing or covering $g^3$, mounted to rock around the cutter-shaft. This housing also supports the ends of a roller $g^4$, lying transversely of the conveyers in advance of the cutter for the purpose of compressing the sheaves as they are carried thereunder to the cutting mechanism, in order that the bands may be slackened and presented more advantageously to the cutting devices.

The pressure-roll revolves freely in its bearings, and is preferably made of diminishing diameter from the ends toward the middle, as shown in Figs. 4 and 6; but this is not an essential feature, as the roll may be of uniform diameter.

In order to urge the roll downward with a yielding pressure on the grain, I provide the housing with a rod $g^6$, sliding through a stationary guide $g^7$ and encircled by a spiral spring $g^8$, which tends, by rocking or rolling the housing around the cutter-shaft, to depress the roll. The housing serves, it will be seen, in addition to the services already named, to cover and protect the cutting mechanism.

As regards the roller, the only essential requirement is that it shall be located in advance of the cutter; and it is obvious that it may be supported in any appropriate manner, either with or without the capacity to yield vertically.

Near the inner end of each side frame I mount a series of circulatory picker-arms H, arranged to rise through slots in the table in order to open or spread out the grain after the severance of the band and before it is delivered by the side conveyers to the main conveyer. These features are not claimed as part of the present invention, being shown and claimed in an application of Earle and Dorton, filed on the 12th day of December, 1889, Serial No. 333,458.

Each of the rotary cutters is driven in the manner shown in Figs. 2, 3, and 5. The cutter-shaft is provided at the outer end with a beveled pinion $g^{10}$, driven by the pinion $g^{11}$ on a horizontal shaft $g^{12}$, which is supported in fixed bearings and driven through a sprocket-wheel $g^{13}$ on its outer end by a chain $g^{14}$, extending downward around a sprocket-wheel $g^{15}$ on the main driving-shaft I.

The main driving-shaft I is seated transversely under the main frame in bearings thereon, and is provided at one end with a driving-pulley $i$, through which it receives motion by a belt $i'$ from a pulley $i^2$ on the shaft of the thrasher-cylinder. This cylinder receives motion from an engine or other motor through a belt $i^3$, which passes around the cylinder-pulley over the outside of the belt $i'$. Thus it will be seen that a constant motion is transmitted from the motor to the thrasher-cylinder, and thence back to the main shaft I of my machine, from which a constant motion is communicated to the rotary band-cutters.

The lower cone-shaft E, which transmits motion to the side conveyers, is also provided with a pulley $e^4$, communicating motion through belt $e^5$ to a pulley $e^6$ on the roll which carries the lower end of the main conveyer, the one shaft E thus serving to drive both the main and the side conveyers.

In practice it is found that the thrasher-cylinder will frequently, as a result of overfeeding or from other causes, have its speed diminished to such extent that it will not thrash or dispose of the grain, the result being a checking or clogging of the machine and a cessation of the thrashing action. I have therefore provided means for automatically stopping the motion of the conveyers whenever the speed of the thrasher-cylinder falls below a predetermined point. The contrivance for this purpose is the automatic clutch-pulley K, already referred to and illustrated in detail in Figs. 7 to 10. It is constructed as follows: A pulley proper $k$, having an overhanging annular flange on one side, is mounted loosely on the driving-shaft I, which, it will be remembered, receives a constant rotation. On the end of the shaft within the pulley is keyed a cross-head $k'$, and to the sides of this cross-head are applied two independently-sliding plates $k^2$ and $k^3$, each provided at one end with a friction-block $k^4$ of wood or other equivalent material, intended to bear against the inner surface of the pulley in order to cause its rotation with the cross-head and shaft.

The sliding bars are each provided at one end with a pair of studs $k^5$, which are projected through the slots in the cross-head and arranged to embrace the inner ends of the respective levers $k^6$. These levers are connected to opposite ends of the cross-head by pivots $k^7$, and are each provided with a weight $k^8$, so that when the levers are rapidly revolved by the shaft and cross-head the centrifugal force developed causes the levers to urge the sliding plates endwise and force the friction-blocks against the pulley. Thus it is that the pulley is locked firmly to the driving-shaft and caused to communicate motion to the conveyers whenever the speed of the thrasher-cylinder, with which the shaft is connected, is above the prescribed limit.

In order to insure the release of the pulley when the speed falls below the proper limit and to prevent the clutch action until the limit is reached, the cross-head is provided with two leaf-springs $k^9$, bolted at one end by means of bolts $k^{12}$ to a flange or rib $k^{13}$, formed on the cross-head, and connected at their outer ends by links $k^{10}$ to the levers, their tendency being to draw the levers inwardly and draw the friction-blocks out of contact with the pulley. The plates $k^2$ and $k^3$ may be attached to and guided upon the cross-head in any suitable manner. As shown in the drawings, they are guided by the studs $k^5$ and by studs $k^{11}$, formed on one of the plates and projected through slots in the other, as shown in Fig. 8.

From the foregoing description it will be seen that the cutters are driven constantly from the shaft I, which, through the automatic speed-controlled clutch, gives motion to the conveyers, so that the cutters are driven independently of the conveyers from the same shaft. As a result of this arrangement, when for any cause the conveyers cease to operate the cutters continue to run. This is advantageous, in that the cutters do not require to be started each time the conveyers are started, so that at all times, owing to their momentum, the cutters are prepared to operate on the incoming bundles. If the arrangement were such that it was necessary to start the cutters each time the conveyers were started, much time would be required for the cutters to acquire the requisite speed to properly operate.

Having thus described my invention, what I claim is—

1. In a band-cutting and feeding mechanism, the main conveyer, the side conveyer, and intermediate driving-connections, including the reverse cones and their connecting-belt, whereby the relative speeds of the main and side conveyers may be changed at will.

2. In a band-cutter and feeder, the main and the side conveyers, the main driving-shaft I, the automatic speed-controlled clutch, through which the conveyers are driven from the shaft, and the band-cutter independently driven from said shaft, whereby the cutter is kept in motion, but the conveyers stopped when the speed of the shaft falls below a fixed limit.

3. In a band-cutter and feeder, the combination of a grain-conveyer, a band-cutter thereover, and a grain-compressing roll of diminishing diameter from its ends toward its middle, arranged in advance of the cutter.

4. In a band-cutter and feeder, the combination of a grain-conveyer, a band-cutter thereover, a grain-compressing roll in advance of the cutter, and a roll-support movable vertically on an axis located in rear of the cutter.

5. In a band-cutter and feeder, a grain-conveyer, in combination with a fixed transverse blade overlying the grain-passage, and a rotary head provided with spirally-arranged blades acting in connection with the fixed blade to sever the grain-bands.

6. In a band-cutter and feeder, the rotary cutter-head and its shaft, in combination with the housing revoluble around the cutter-shaft, and the blade and grain-compressing roller sustained by the housing.

7. In a band-cutter, a grain-conveyer, in combination with the transverse rotary cutter-head, the blade $g$, the roller, and a rising and falling support for the blade and roller, whereby the blade is caused to rise and fall with the roller as the latter floats upon the grain in order to insure the proper severance of the grain-bands.

In testimony whereof I hereunto set my hand, this 20th day of December, 1889, in the presence of two attesting witnesses.

ROBERT E. DORTON.

Witnesses:
THOS. A. WHITWORTH,
C. A. BAKER.